United States Patent
Moore et al.

(10) Patent No.: US 6,574,332 B1
(45) Date of Patent: Jun. 3, 2003

(54) AUTOMATIC CALL DISTRIBUTION SYSTEM AGENT LOG-ON WITH PSEUDO-PORT

(75) Inventors: Tim Moore, Naperville, IL (US); Paul Fischer, Downers Grove, IL (US); Darryl Hymel, Batavia, IL (US)

(73) Assignee: Rockwell Electronic Commerce Technologies LLC, Wood Dale, IL (US)

( * ) Notice: Subject to any disclaimer, the term of this patent is extended or adjusted under 35 U.S.C. 154(b) by 0 days.

(21) Appl. No.: 09/489,631

(22) Filed: Jan. 24, 2000

(51) Int. Cl.[7] ................................................ H04M 3/00
(52) U.S. Cl. .......................... 379/265.02; 379/266.02
(58) Field of Search ........................ 379/265.01, 265.02, 379/265.04, 266.02, 309

(56) References Cited

U.S. PATENT DOCUMENTS

| | | | |
|---|---|---|---|
| 5,140,611 A | 8/1992 | Jones et al. | 375/7 |
| 5,268,903 A | 12/1993 | Jones et al. | 370/110.1 |
| 5,335,269 A | 8/1994 | Steinlicht | 379/266 |
| 5,365,581 A | 11/1994 | Baker et al. | 379/196 |
| 5,400,327 A | 3/1995 | Dezonno | 370/62 |
| 6,018,579 A * | 1/2000 | Petrunka | |
| 6,404,857 B1 * | 6/2002 | Blair et al. | |
| 6,434,231 B2 * | 8/2002 | Neyman et al. | |

* cited by examiner

Primary Examiner—Creighton Smith
(74) Attorney, Agent, or Firm—Welsh & Katz, Ltd.

(57) ABSTRACT

Method and apparatus for accomplishing an agent log-on to an automatic call distribution system, which requires a telephone identifier corresponding with an agent, without making a circuit switched telephone connection or using a circuit switched voice port. A pseudo-port is used to emulate the circuit switched voice port, permitting completion of the log-on, and permitting execution of "call" handling functions with respect to the agent for "calls" not requiring a circuit switched telephone connection.

34 Claims, 3 Drawing Sheets

AUTOMATIC CALL DISTRIBUTION SYSTEM AGENT LOG-ON WITH PSEUDO-PORT

BACKGROUND AND SUMMARY

The present invention relates to adapting an existing automatic call distribution (ACD) system, designed for routing telephone calls, to allow log-on of an agent without use of a circuit switched voice port.

ACD systems are typically used to distribute telephone calls among a group of agents of an organization. ACD systems may be used to distribute calls under any of a number of different formats. In a first instance, the term "call" may be used to refer to a request for communication received from (or placed through) a public switched telephone network (PSTN). A call may also be a voice path based upon packet data transferred through the Internet using web telephony. Alternatively, a call may be any communication such as an e-mail, a facsimile, video, website inquiry received through the Internet, etc. Thus, ACD systems are transaction processing systems which typically handle one or more of a wide variety of these "call" types.

An organization often disseminates a single telephone number, URL or e-mail address to customers and to the public in general as a means of contacting the organization. As calls are directed to the organization from the PSTN or the Internet, the ACD system directs the calls to the organization's agents based upon some algorithm. For example, where all agents are considered equal, the ACD may distribute a call based on which agent has been idle the longest time. Of course, there are many other possible ways to select an agent, or a subgroup of agents from whom an available one will be selected.

The ACD system is typically provided with at least two routing mechanisms for establishing call paths between callers and agents. A first path may be established through a circuit switched voice port, such as for calls from the PSTN. An alternative path may be a data link (such as over a Local Area Network (LAN)) such as for an e-mail received through a computer network such as the Internet.

Control of the switching and communications with a database and with an external network such as a PSTN may, for example, be accomplished generally as described in U.S. Pat. Nos. 5,268,903 and 5,140,611, both to Jones et al. which are hereby incorporated by reference. Routing of calls to agents may, for example, be accomplished generally as described in U.S. Pat. No. 5,335,269 to Steinlicht, U.S. Pat. No. 5,365,581 to Baker et al., and U.S. Pat. No. 5,400,327 to Dezonno, which are hereby incorporated by reference.

An ACD system generally will direct calls only to agents who have "logged-on." That is, the system will not direct a call to an agent station, if there is no agent present to handle calls. Of course, an agent may be occupied with another call at a given time, but the agent would not even be eligible to receive calls if not logged-on.

Many existing ACD systems were created with a focus on circuit switched telephone communications, and other call formats were incorporated into the system as the need arose. However, there can be a data link with most agents even if many agents handle only circuit switched telephone calls. For example, it may be important for an agent to have ready access to customer files in systems associated with service organizations, where many calls are received and handled by many agents. A database is maintained of existing customer files, which may be displayed on agent terminals as the agents converse with specific customers.

In a typical agent log-on procedure, the agent utilizes software which can transmit information such as an agent identifier, a telephone identifier, and a data processing station identifier to the ACD. The ACD establishes a connection to the identified telephone via a circuit switched voice port. Once that telephone connection is established, the "log-on" is completed, and the agent is eligible to receive calls. Telephone calls may be directed through that circuit switched voice port. Other call formats, such as e-mail, may be directed to that agent's data processing station, such as a personal computer.

There are ACD systems which were never designed to route circuit switched telephone calls, or which were never designed to require a circuit switched telephone connection to establish agent log-on. However, there is a need for an ACD, which normally logs-on an agent by establishing a circuit switched telephone connection with the agent's telephone, or at least normally requires entry of a telephone identifier, to be able to log-on an agent (who will handle calls only in other formats) without using a circuit switched voice port. In this way, it will be possible to make more efficient use of circuit switched voice ports.

The log-on is accomplished by using a "pseudo port" to emulate the operations of a circuit switched voice port in the existing ACD system. It includes allocation of memory resources, linkage to the agent connection, and initialization of system data in order to satisfy the operating requirements of the existing ACD system. An indication of a need for a pseudo-port is input into the ACD in lieu of an agent telephone identifier. Upon receipt of that indication, the ACD assigns and initializes a selected portion of computer memory for the agent as it would have if a circuit switched telephone connection were established. The agent is rendered eligible to receive calls, but only non-circuit switched telephone calls will be directed to that agent.

The features of the present invention which are believed to be novel are set forth below with particularity in the appended claims. The invention, together with further advantages thereof, may be understood by reference to the following description in conjunction with the accompanying figures, which illustrate some embodiments of the invention.

DETAILED DESCRIPTION

Figure 1:
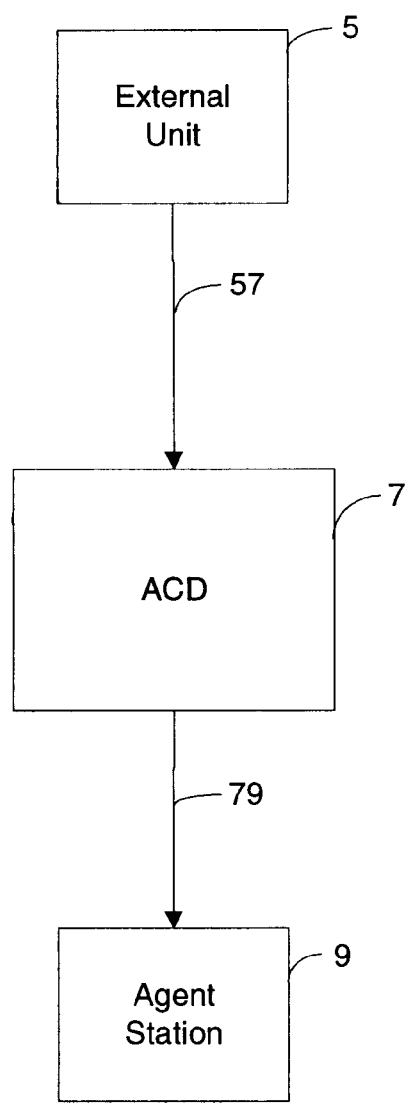
FIG. 1 is a functional block diagram illustrating an example of communication between an external unit and an ACD, and between an ACD and an agent station.

FIG. 1 is a functional block diagram illustrating an example of communication between an external unit 5 and an automatic call distribution (ACD) server 7, and between the ACD server 7 and an agent station 9. Communication 57 between external unit 5 and ACD server 7 can be in any one or any combination of ways, such as through a public switched telephone network (PSTN), an internet network, a local area network, or other voice and/or data network.

Upon receiving a call from an external unit 5, the ACD server 7 will process the call by routing it to an agent at an agent station 9. The agent can be one of a plurality of agents at a plurality of agent stations 9. Communication 79 between ACD server 7 and agent station 9 can include a data link and/or a circuit switched telephone connection. Communication 79 could be through a private network and/or a public network (particularly for a remote agent). Communication 79 could include hardwire and/or wireless communications.

Figure 2:
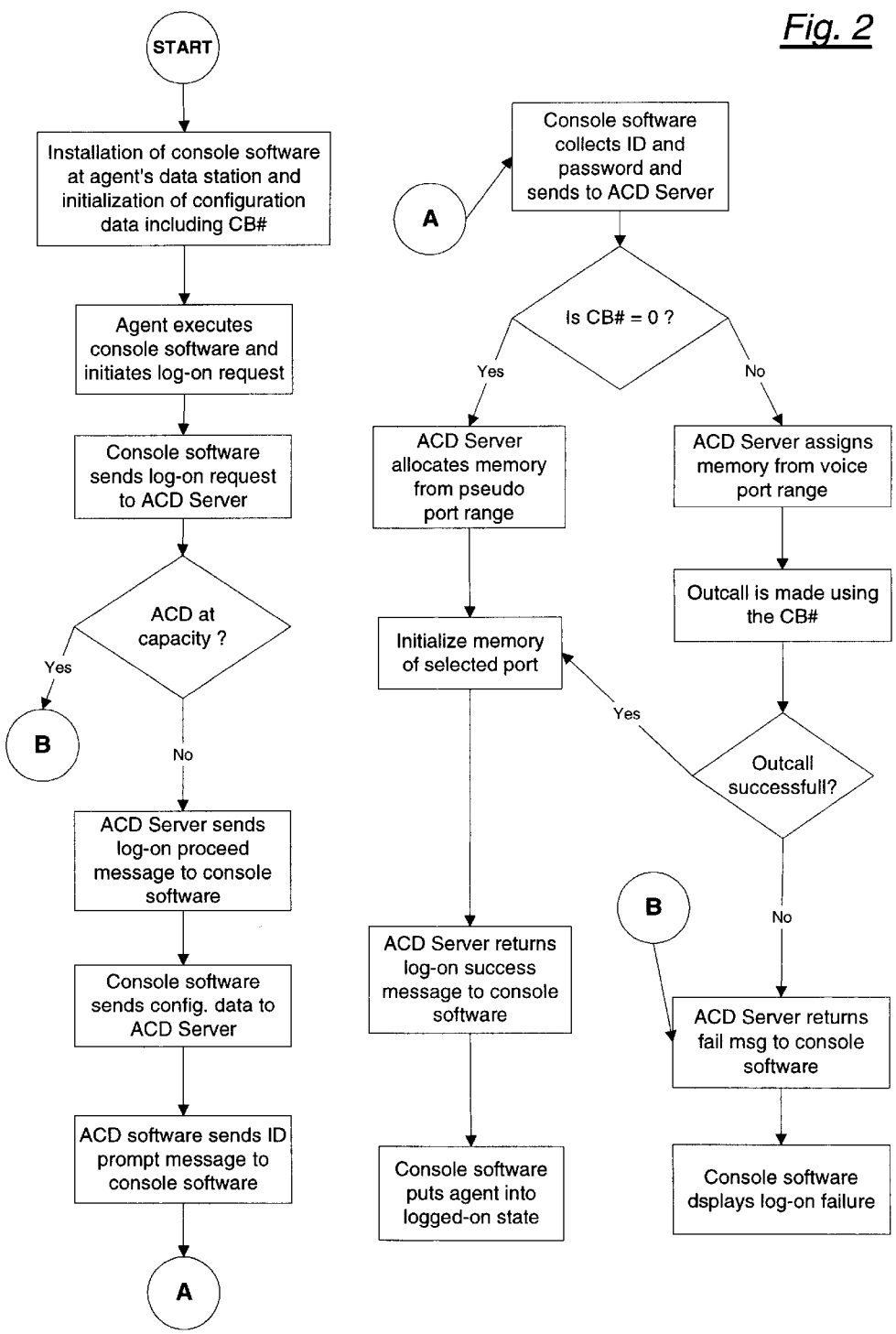
FIG. 2 is a flow chart illustrating an example of an agent log-on in accordance with the present invention.

FIG. 2 is a flow chart illustrating an example of an agent log-on in accordance with the present invention. The agent can initiate log-on at a data processing station 9, such as a personal computer. Necessary software can be installed and certain configuration data initialized. For example, configuration data can include identifiers for the ACD server 7 and the data processing station 9. In one embodiment, the configuration data can include identification information regarding the agent. The configuration data also can include a "call back number" or CB#. The CB# can be a telephone identifier—such as a telephone number for the purpose of the ACD server 7 establishing a circuit switched telephone connection. However, the CB# can be a different indicator signifying that the agent will not be handling circuit switched telephone calls. For purposes of discussion, that indicator signifying that the agent will not be handling circuit switched telephone calls will be denoted as a CB# of 0.

Continuing with FIG. 2, a log-in request can be initiated and sent to ACD server 7. In one embodiment, ACD server 7 will determine whether the system is at capacity or can handle more agents. If the system is at capacity, a fail message can be returned to the agent's station 9 which can display log-in failure. Alternatively, a proceed message can be returned to the agent's station 9, which can send certain configuration data including a CB#. In one embodiment, ACD server 7 can request an agent identifier and/or a password. The agent can supply requested information if it was not already provided. In another embodiment, such information can have been provided sooner with other configuration data.

Continuing with FIG. 2, if the CB# is not 0 but is, for example, a circuit switched telephone number, then ACD server 7 can assign a selected portion of memory for the agent, from a range reserved for circuit switched voice ports. ACD server 7 can make a circuit switched telephone call to the CB#, and can initialize the selected portion of memory if the call is successfully established.

However, if the CB# is 0, then ACD server 7 can assign and initialize a selected portion of memory for the agent, from a range reserved for pseudo-ports. In other words, the portion of memory assigned will be within a range for which circuit switched telephone calls are not routed.

Continuing with FIG. 2, the selected portion of memory is initialized either way, and ACD server 7 can return a log-on success message to agent station 9. The agent is logged-on and eligible for call routing.

The initialization of the selected portion of memory can involve any number of conditions and limitations. For example, there can be limitations regarding whether the agent can only take calls, or also can make calls. There can be limitations about the agent taking or making only internal calls from or to other destinations within the system. There can be specified call forwarding destinations. There can be data regarding agent identity, supervisor identity, or agent group. Such data can affect reporting functions as well as call routing.

In an alternative embodiment, there would not be distinct ranges of memory for pseudo-ports. However, the initialization of the assigned portion of the memory could include a limitation precluding the routing of circuit switched telephone calls to that agent. In other words, a CB# of 0 would not lead to assignment from a particular range of memory reserved for pseudo-ports, but would lead to initialization of the assigned portion of memory as a pseudo-port.

Figure 3:
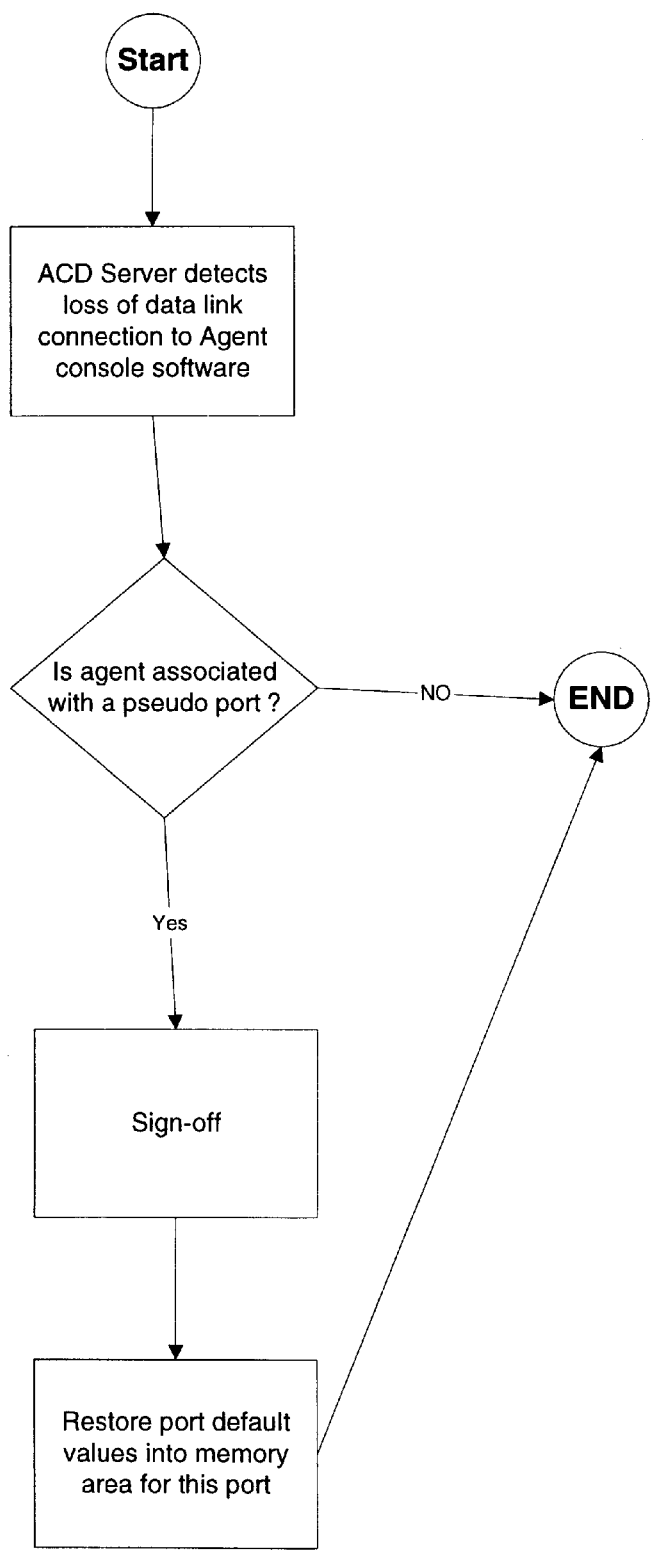
FIG. 3 is a flow chart illustrating an example of ACD operation upon an indication of loss of the data link with an agent station in accordance with the present invention.

FIG. 3 is a flow chart illustrating an example of operation of ACD server 7 upon an indication of loss of the data link with an agent in accordance with the present invention. Even if agent log-on was accomplished using a circuit switched voice port, there can still be a data link with an agent station 9 in order to handle calls in other formats, and in order for an agent to have access to customer files while engaged in a circuit switched telephone call. In the latter case in particular, it is important that a circuit switched telephone call not be terminated simply because of loss of the data link to the agent. However, as shown in the example of FIG. 3, if agent log-on was accomplished with a pseudo-port, then loss of the data link to the agent should result in an automatic sign-off. This can result in restoration of default values into the selected portion of memory which had been assigned for the agent, and availability of that portion of memory for another assignment.

The embodiments discussed and/or shown in the figures are examples. They are not exclusive ways to practice the present invention, and it should be understood that there is no intent to limit the invention by such disclosure. Rather, it is intended to cover all modifications and alternative constructions and embodiments that fall within the scope of the invention as defined in the following claims.

What is claimed is:

1. A method of accomplishing an agent log-on to an automatic call distribution (ACD) system, the ACD requiring a telephone identifier corresponding with an agent, the method comprising:

inputting to the ACD, in lieu of an agent telephone identifier, an indicator of a need for a pseudo-port; and assigning and initializing a selected portion of computer memory for said agent, rendering said agent eligible for receiving non-circuit switched calls.

2. The method as in claim 1, wherein communication between the ACD and an agent station is accomplished via a hardwire communication link.

3. The method as in claim 2, wherein the communication link is a local area network.

4. The method as in claim 1, further comprising:

determining whether capacity for another agent log-on exists, and proceeding to the assigning and initializing step only if said capacity exists.

5. The method as in claim 1, further comprising inputting an agent identifier to the ACD.

6. The method as in claim 1, further comprising inputting a password to the ACD.

7. The method as in claim 1, further comprising inputting an agent data processing station identifier to the ACD.

8. The method as in claim 1, wherein the portion of computer memory is selected from a range reserved for pseudo-ports.

9. The method as in claim 1, wherein initialization of the assigning and initializing step includes at least one limitation selected from a group consisting of: no incoming calls, no outgoing calls, no external incoming calls, no external outgoing calls, and call forwarding to specified destinations.

10. The method as in claim 1, wherein initialization of the assigning and initializing step includes agent-related data.

11. The method as in claim 1, wherein initialization of the assigning and initializing step includes a limitation precluding routing of circuit switched telephone calls to the agent.

12. The method as in claim 1, further comprising making the selected portion of computer memory available for reassignment and restoring default values into said memory portion, upon loss of a data link between the ACD and an agent station.

13. An apparatus for accomplishing an agent log-on to an automatic call distribution (ACD) system, the ACD requiring a telephone identifier corresponding with an agent, the apparatus comprising:

means for inputting to the ACD, in lieu of an agent telephone identifier, an indicator of a need for a pseudo-port; and means for assigning and initializing a selected portion of computer memory for said agent, rendering said agent eligible for receiving non-circuit switched calls.

14. The apparatus as in claim 13, further comprising means for determining whether capacity for another agent log-on exists.

15. The apparatus as in claim 13, further comprising means for inputting a password to the ACD.

16. The apparatus as in claim 13, wherein the portion of computer memory is selected from a range reserved for pseudo-ports.

17. The apparatus as in claim 13, wherein initialization by the assigning and initializing means includes setting a limitation precluding routing of circuit switched telephone calls to the agent.

18. The apparatus as in claim 13, further comprising means for making the selected portion of computer memory available for reassignment and restoring default values into said memory portion, upon loss of a data link between the ACD and an agent station.

19. And The method as in claim 1, wherein communication between the ACD and an agent station is accomplished via a public computer network.

20. An apparatus for accomplishing an agent log-on to an automatic call distribution (ACD) system, the ACD system requiring a telephone identifier corresponding with an agent, the apparatus comprising:

a communication link input to the ACD system configured to receive a request for a pseudo-port in lieu of an agent telephone identifier; and a portion of computer memory which is assigned to the agent and initialized in response to the request, to render the agent eligible for receiving non-circuit switched calls.

21. The apparatus as in claim 20, further comprising a hardwire communication link between the ACD system and an agent station.

22. The apparatus as in claim 20, wherein the portion of computer memory is selected from a range of memory locations reserved for pseudo-ports.

23. The apparatus as in claim 20, wherein the portion of computer memory is capable of being initialized to preclude routing of circuit switched telephone calls to the agent.

24. The apparatus as in claim 20, wherein the portion of computer memory is capable of being restored to default values and reassigned upon loss of a data link between the ACD system and an agent station.

25. A method of accomplishing an agent log-on to an automatic call distribution (ACD) system, the ACD requiring a telephone identifier corresponding with an agent, the method comprising:

inputting to the ACD, in lieu of an agent telephone identifier, an indicator of a need for a pseudo-port; and assigning and initializing a selected portion of computer memory for said agent, rendering said agent eligible for receiving non-circuit switched calls;

wherein the communication between the ACD and an agent station is accomplished via wireless communication.

26. The method as in claim 25, further comprising:

determining whether capacity for another agent log-on exists, and proceeding to the assigning and initializing step only if said capacity exists.

27. The method as in claim 25, further comprising inputting an agent identifier to the ACD.

28. The method as in claim 27, further comprising inputting a password to the ACD.

29. The method as in claim 25, further comprising inputting an agent data processing station identifier to the ACD.

30. The method as in claim 25, wherein the portion of computer memory is selected from a range reserved for pseudo-ports.

31. The method as in claim 25, wherein initialization of the assigning and initializing step includes at least one limitation selected from a group consisting of: no incoming calls, no outgoing calls, no external incoming calls, no external outgoing calls, and call forwarding to specified destinations.

32. The method as in claim 25, wherein initialization of the assigning and initializing step includes agent-related data.

33. The method as in claim 25, wherein initialization of the assigning and initializing step includes a limitation precluding routing of circuit switched telephone calls to the agent.

34. The method as in claim 25, further comprising making the selected portion of computer memory available for reassignment and restoring default values into said memory portion, upon loss of a data link between the ACD and an agent station.

* * * * *